June 25, 1929.                M. E. BAKER                1,718,624
                    FISH BAKING AND LIFTING RACK
                         Filed Jan. 15, 1929
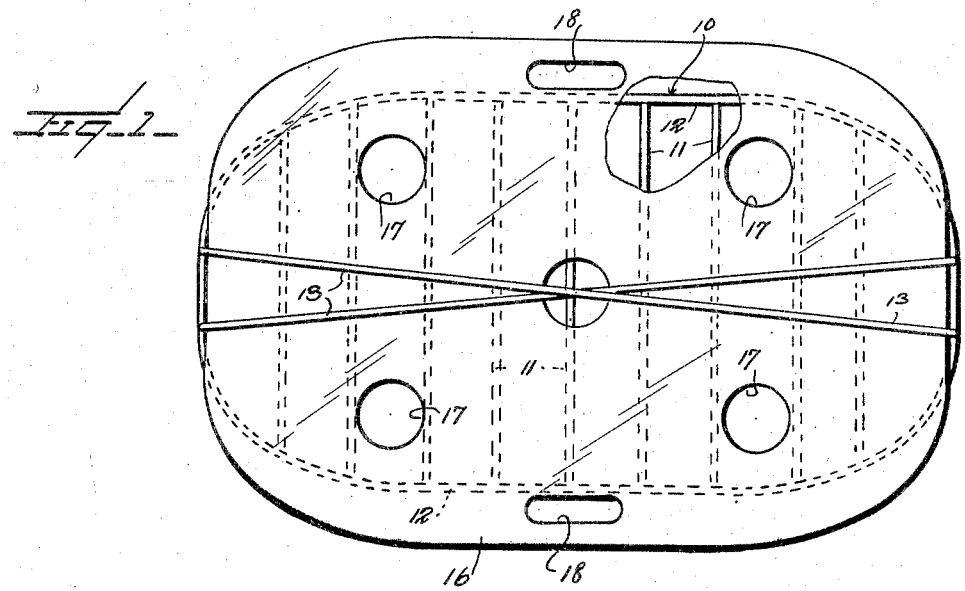
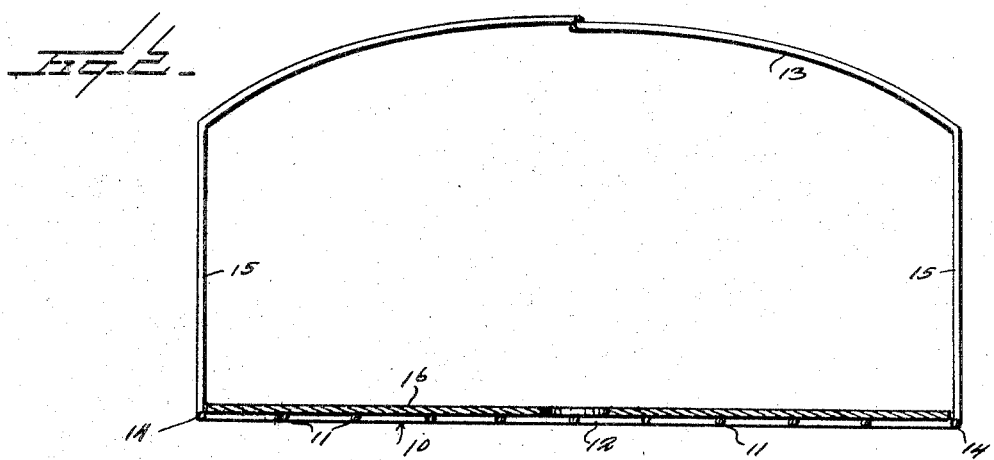
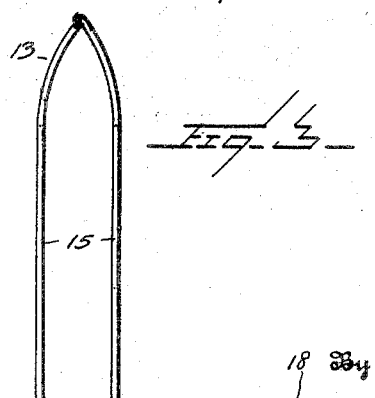
Inventor
M. E. Baker
By Watson E. Coleman
                Attorney Patented June 25, 1929.

1,718,624

UNITED STATES PATENT OFFICE.

MARY ELIZABETH BAKER, OF EASTON, PENNSYLVANIA.

FISH BAKING AND LIFTING RACK.

Application filed January 15, 1929. Serial No. 332,623.

This invention relates to cooking utensils and particularly to a rack for baking fish or like food.

The general object of the invention is to provide a rack for cooking fish, particularly for baking fish, which is so constructed that the grease will be drained from the fish into the baking pan and the fish thus left in a more appetizing condition than is otherwise the case.

A further object of the invention is to provide a device of this character which includes a wire rack and a fish supporting plate carried by the rack but removable therefrom, the plate being apertured for the passage of grease and the plate being so constructed as to permit its being removed from the rack and disposed upon a platter with the fish thereon or removed from the rack and the fish discharged upon a platter.

My invention is illustrated in the accompanying drawing, wherein:—

Figure 1 is a top plan view of a fish lifting and baking rack constructed in accordance with my invention;

Figure 2 is a longitudinal sectional view thereof;

Fig. 3 is a transverse sectional view thereof.

Referring to the drawing, 10 designates generally a rack preferably made of wire and which consists of the spaced cross members 11 and the marginal member 12. Handles 13 are connected to the ends of the rack, these handles being formed of two separate wires disposed diagonally with relation to each other and engaged at 14 with the ends of the rack at spaced points. Preferably the wires 13 where they intersect are welded and preferably the wires are welded to the rack at their extremities. Also it is preferable that the wires constituting the handle extend for a distance straight upward from the bottom of the rack and then curve over longitudinally of the rack as shown most clearly in Figure 2.

Adapted to be disposed upon the rack and fit more or less snugly therein between the straight portions of the handles is a plate 16 which is preferably of aluminum, this plate being somewhat oval in form and having a length slightly less than the length of the rack so that it may fit between the extremities of the wires 13 and having a width somewhat greater than the rack. This plate is formed with a plurality of openings 17 constituting draining openings and through which grease may fall from the plate into the baking pan with which the rack and plate are designed to be used. The plate is also formed with two elongated openings or slots 18 through which a fork or other implement may be engaged to withdraw the plate from the rack.

While I do not wish to be limited, of course, to any particular dimensions for this rack and plate, preferably it will conform in contour and size to the contour and size of an ordinary roaster with which it may be used. In actual practice the lifting rack will have a length of approximately 10½ inches and a width of 5½ inches. The handle at its middle will preferably be 5½ inches and the straight portions 15 of the handle shall be 4 inches in height. The lifting rack 10 rests upon the bottom of the roaster. The plate is about ⅛th of an inch thick and is preferably made of aluminum and has a perfectly flat surface. The ends of the plate should fit sufficiently snugly between the ends of the handle as to enable handling of the whole structure without the plate slipping from the rack and yet at the same time permit the plate to be easily removed from the rack. By placing a fork or other suitable implement in the openings or slots 18, the plate may be readily removed from the rack.

In use, the fish is placed upon this plate 16 which in turn is placed upon the rack. The whole is then placed within an aluminum roaster of ordinary form which is placed upon the top of the stove while the fish is cooking. When the rack is in place within the roaster, a space is formed between the plate 16 and the bottom of the roaster which constitutes a receptacle for the fat or grease. This device may also be used to bake fish in the oven by simply placing the rack in any ordinary baking pan which serves as a dripping pan.

It will be seen that my utensil is formed in two pieces, the plate and the rack and that the plate is preferably formed of aluminum. Aluminum when thoroughly heated retains the heat a long while. Therefore, when serving fish, the housewife can place a mat of paper upon a platter to protect the platter from the hot aluminum plate, then the aluminum plate containing the fish may be placed upon the platter and the fish will remain hot until the last portion is served.

By making the plate flat and without any grease retaining depressions the fish is prevented from becoming soggy and hence highly indigestible. No fat or grease can lie upon the top of this plate and become absorbed by the fish.

I claim:—

1. A baking utensil of the character described comprising an open-work rack having a handle arching over the rack, and a perforated plate detachably supported upon the rack, the plate being wider than the rack and having openings on its side edges whereby it may be withdrawn from the rack.

2. A baking utensil of the character described comprising a wire rack, wires constituting handles and extending straight upward from the rack for a distance and then extending longitudinally above the rack, the wires being connected with each other at the middle of the rack, and a flat plate having perforations and disposed upon the rack and having a length approximately equal to the distance betwen the wires of the handles at their point of connection with the rack and having a width greater than the width of the rack, the plate being provided with openings at its sides whereby it may be withdrawn from the rack.

In testimony whereof I hereunto affix my signature.

MARY E. BAKER.